(12) United States Patent
Beavington

(10) Patent No.: US 6,279,940 B1
(45) Date of Patent: Aug. 28, 2001

(54) DEVICE FOR GUIDING THE COUPLING OF A TRAILER HITCH

(76) Inventor: Richard N. Beavington, 201 Quinn Court, Kelowna, British Columbia (CA), V1X 7B3

( * ) Notice: Subject to any disclaimer, the term of this patent is extended or adjusted under 35 U.S.C. 154(b) by 0 days.

(21) Appl. No.: 09/447,210

(22) Filed: Nov. 23, 1999

Related U.S. Application Data

(60) Provisional application No. 60/109,996, filed on Nov. 25, 1998.

(51) Int. Cl.⁷ ........................................................ B60D 1/40
(52) U.S. Cl. ............................................ 280/477; 33/286
(58) Field of Search .................................. 280/477, 495, 280/504, 508; 33/264, 286, 288, 293

(56) References Cited

U.S. PATENT DOCUMENTS

| | | | |
|---|---|---|---|
| 3,159,917 | * 12/1964 | Whitehead | 280/477 |
| 3,765,703 | 10/1973 | Voelkerding et al. | 280/477 |
| 3,866,328 | 2/1975 | Alexander et al. | 33/264 |
| 3,918,746 | * 11/1975 | Lehtisaari | 280/477 |
| 4,012,056 | 3/1977 | Christensen | 280/477 |
| 4,054,302 | 10/1977 | Campbell | 280/477 |
| 4,065,147 | * 12/1977 | Ross | 280/477 |
| 4,560,183 | 12/1985 | Cook | 280/477 |
| 4,666,176 | 5/1987 | Sand | 280/477 |
| 4,961,590 | 10/1990 | Davenport | 280/477 |
| 5,036,593 | * 8/1991 | Collier | 280/477 |
| 5,290,056 | 3/1994 | Fath, IV | 280/477 |
| 5,309,289 | * 5/1994 | Johnson | 280/477 |
| 5,328,199 | * 7/1994 | Howe | 280/477 |
| 5,669,621 | 9/1997 | Lockwood | 280/477 |
| 5,680,706 | * 10/1997 | Talcott | 280/477 |
| 5,755,453 | * 5/1998 | Bell | 280/477 |

FOREIGN PATENT DOCUMENTS

| | | | |
|---|---|---|---|
| 951554 | * 7/1974 | (CA) | 280/477 |

* cited by examiner

Primary Examiner—Daniel G. DePumpo
(74) Attorney, Agent, or Firm—Antony C. Edwards

(57) ABSTRACT

A trailer hitch coupling device includes an elongate rigid member mountable at a first end thereof to a forward end of a trailer so as to dispose, when the first end is mounted to the forward end of the trailer, a distal end of the rigid member forwardly of the forward end of the trailer into proximity to an appliqué when the appliqué is mounted to a rear surface of a towing vehicle. The appliqué is mounted so as to: (a) be viewable by a driver of the vehicle when the vehicle is translated rearwardly; and, (b) vertically align a hitch hood on the trailer with a hitch ball on the vehicle.

13 Claims, 9 Drawing Sheets

DEVICE FOR GUIDING THE COUPLING OF A TRAILER HITCH

CROSS REFERENCE TO RELATED APPLICATION

This application claims priority from U.S. Provisional Patent Application No. 60/109,996 filed Nov. 25, 1998 titled Device For Guiding The Coupling Of A Trailer Hitch

FIELD OF THE INVENTION

This invention relates to the field of trailer hitch as generally and in particular to an apparatus for attachment to an existing trailer hitch which enables an operator of a vehicle to be used as a tractor for the trailer to guide the vehicle hitch male coupler into alignment with the corresponding female coupler on the trailer without the operator of the vehicle having to leave the driving position.

BACKGROUND OF THE INVENTION

Many types of trailer/tractor hitches are available in the prior art and, although the present disclosure will deal trailer hitches of the ball and corresponding mating hood variety, it is understood that the apparatus of the present invention is intended to be used generally on any style of trailer hitch device where the operator of the vehicle is generally unable to physically directly view the engagement of the hitch ball with the hood. Typically, the hitch ball is rigidly mounted to the tow vehicle below the line of sight from the vehicle operator sitting in the normal driving position because of the intervening tailgate on a pickup truck or tailgate on a van, or trunk on a conventional sedan car.

Because line of sight viewing of the actual engagement of a trailer hood over a vehicle mounted hitch ball is commonly unavailable, a vehicle operator has to estimate an approximate alignment of the hood with the ball and one or more times exit the vehicle to check the alignment so as to guide the vehicle to place the hitch ball generally vertically beneath the elevated trailer hood. Misalignment can often result in slight damage to the vehicle. Therefore, there exists a continuing need for a trailer hitch guide so that a vehicle operator can guide the hitch ball into a vertically aligned coupling position under a trailer drawbar mounted hood so that the hood may then be lowered into engagement with the hitch ball.

In the prior art of which applicant is aware, many attempts have been made to solve this problem. In particular, applicant is aware of following United States patents: U.S. Pat. No. 5,669,621 which issued Sep. 23, 1997 to Lockwood for a Vehicle Alignment Device, U.S. Pat. No. 5,290,056 which issued Mar. 1, 1994 to Fath for a Trailer Hitch Guide, U.S. Pat. No. 4,961,590 which issued Oct. 9, 1990 to Davenport for a Trailer Hitching Apparatus, U.S. Pat. No. 4,666,176 which issued on May 19, 1987 to Sand for a Trailer Hitch Guide, U.S. Pat. No. 4,560,183 which issued Dec. 24, 1985 to Cook for a Trailer Hitch Guide, U.S. Pat. No. 4,054,302 which issued Oct. 18, 1977 to Campbell for a Trailer Hitch Guide Means, U.S. Pat. No. 4,012,056 which issued Mar. 15, 1977 to Christensen for Visual Guide Device For Hitching Vehicles, U.S. Pat. No. 3,866,328 which issued Feb. 18, 1975 to Alexander for a Trailer Hitch Guide, and U.S. Pat. No. 3,765,703 which issued to Voelkerding for a Trailer Hitch Guiding Device.

Typically in the prior art references, the devices provide a sight guide mounted in some fashion to the drawbar hood on the trailer and a corresponding sight guide mounted on the hitch ball or supporting frame on the vehicle. The sight guides are used for primary alignment of the ball and hood. Other devices, such as the Alexander trailer hitch guide, disclose bracketing the trailer hitch drawbar with indicators such as flags that indicate whether the drawbar is out of longitudinal alignment with the hitch ball as the vehicle is translated towards the trailer. Thus movement of the flag such as in the Alexander device, indicates that the trailer drawbar is contacting the flag and is thus out of alignment with the hitch ball. The prior art references all deal with various mechanisms for mounting the sighting and alignment indicators on the vehicle hitch ball or supporting frame.

It is an object of the present invention to improve on the requirement taught in the prior art of a sighting and alignment device that is to be mounted onto the vehicle. It is a further object to the present invention to provide a simplified device which allows for consistent and accurate alignment of the trailer drawbar hood over the hitch ball.

SUMMARY OF THE INVENTION

In summary, the trailer hitch coupling device in one embodiment of the present invention includes first and second elongate rigid members. The first member is mounted or mountable, by first mounting means, on a forward end of a trailer. Reference to "trailer"herein is not intended to be limiting, but rather is intended to include any wheeled device or object intended to be towed behind a vehicle where the coupling between the wheeled device and the vehicle includes a hitch ball on the vehicle and a correspondingly sized draw bar hood rigidly mounted on a drawbar or the like mountable to the wheeled device. The wheeled device may include a drawbar, drawbar jack or crank, or like rigid members including the frame of the wheeled device. The first member, when mounted on the forward end of the trailer, extends upwardly so that an upper end thereof enters a line-of-sight between the upper end of the first member and a vehicle operator sitting at controls of a vehicle being backed towards the forward end of the trailer.

The second member is mounted or mountable, by second mounting means, to generally the upper end of the first member so as to extend forwardly of both the first member and the forward end of the trailer towards a rearward end of the vehicle. A distal end of the second member, distal from the first member when mounted to the second member and closest to the rearward end of the vehicle is positioned so as to align with an alignment indicating first sticker mounted to the rearward end of the vehicle. The sticker is mounted in the line-of-sight from the vehicle operator and is aligned with, and adjacent to, the distal end of the second member when a hitch hood of the trailer is vertically aligned over a hitch ball on the vehicle.

When the vehicle is a van or sedan, the first sticker is mountable to a rear window. Advantageously, the sticker is translucent or transparent, and the distal end is positioned to be adjacent or contacting the sticker when the hitch hood is vertically aligned over the hitch ball.

When the vehicle is a pickup truck, the first sticker is mounted on an inner surface of the tailgate of the pickup truck. In this instance, the distal end is positioned to vertically align over the first sticker over an upper edge of the tailgate when the hitch hood is vertically aligned over the hitch ball.

In one preferred embodiment, the first and second members have longitudinal grooves. The first and second mounting means have flanges sized correspondingly to the grooves so as to snugly mate within the grooves. The first member may thus be rigidly mounted to the first mounting means and the first and second members to the second mounting means. In one aspect of the present invention, the first and second mounting means are clamps. In particular the first mounting means may be a first resilient snap clamp and the second mounting means may be a second snap clamp, for use when the first and second members are tubular shafts, the first and second snap clamps having resilient arms for snug resilient mating around the tubular shafts.

In a further aspect, the second snap clamps are a pair of "C"-shaped snap clamps mounted back-to-back and offset 90 degrees from one another about an axis through the second snap clamp and perpendicular to the first and second members. The first snap clamps may be a pair of "C"-shaped snap clamps mounted spaced apart on the forward end of the trailer, for example on the drawbar, drawbar jack or crank.

In one embodiment, a second sticker may be mounted to the distal end so as to be in opposed facing relation to the first sticker when the hitch hood is vertically aligned over the hitch ball. Advantageously, in this case the first sticker is transparent. In any event, it may assist in aligning and positioning the distal end of the second member into proximity, adjacency or contact with the first sticker if the vehicle operator can see through the first sticker.

In a further embodiment, the trailer hitch coupling device may be described as including an elongate rigid member mountable at a first end thereof to a forward end of a trailer so as to dispose, when the first end is mounted to the forward end of the trailer, a distal end of the rigid member forwardly of the forward end of the trailer into proximity to an appliqué when the appliqué is mounted to a rear surface of the vehicle. The appliqué is mounted so as to: (a) be viewable by a driver of the vehicle when the vehicle is translated rearwardly; and, (b) vertically align a hitch hood on the trailer with a hitch ball on the vehicle.

It is within the scope of the present invention that the first and second members are a single elongate member, or that the second member is pivotally or telescopically mounted to the first member.

BRIEF DESCRIPTION OF THE DRAWINGS

FIG. 6 is, in perspective view, one clamp member of FIG. 3a.

DETAILED DESCRIPTION OF PREFERRED EMBODIMENTS

Figure 1:
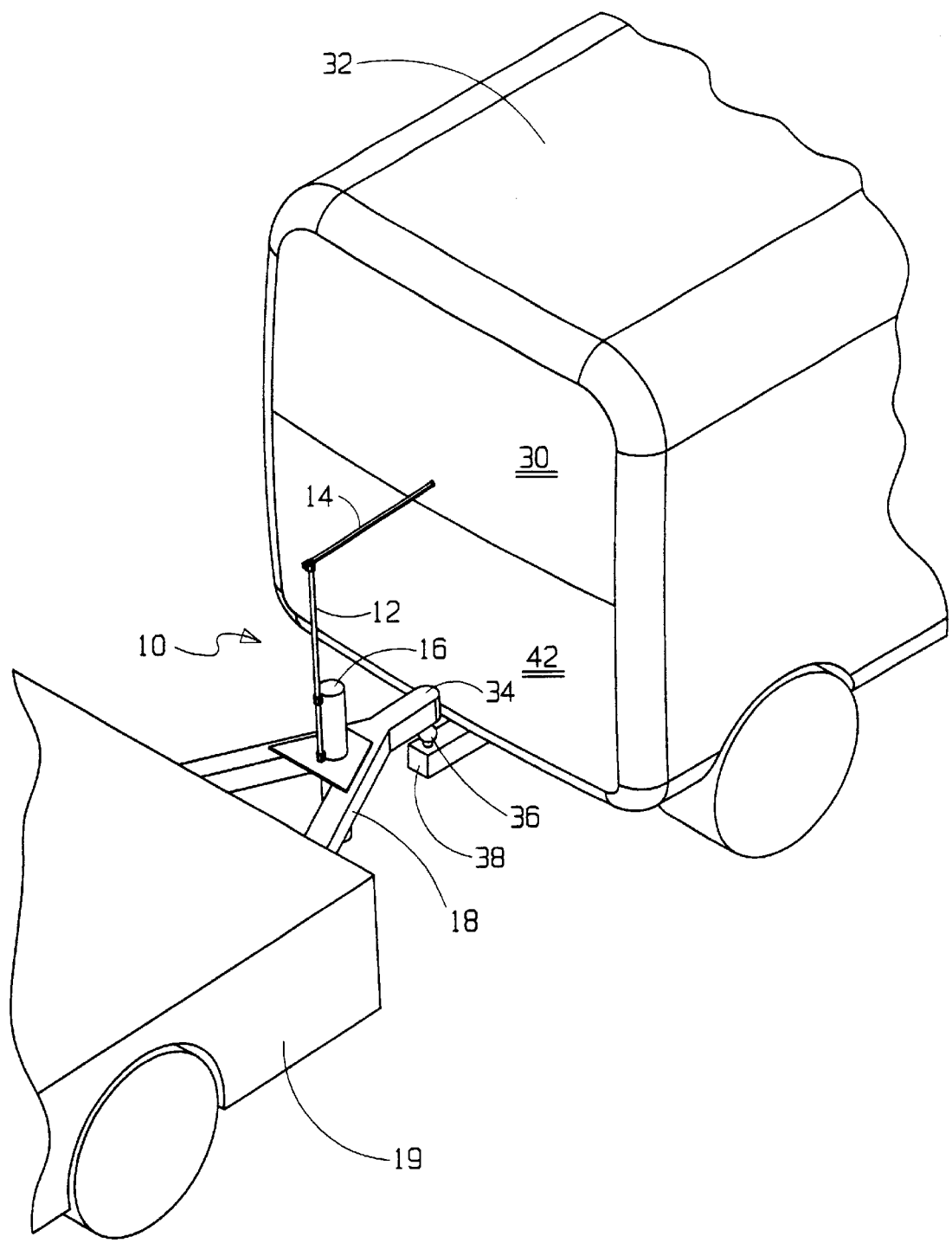
FIG. 1 is, in perspective view, the trailer hitch coupling guide of the present invention mounted to a trailer crank and drawbar.
Figure 2:
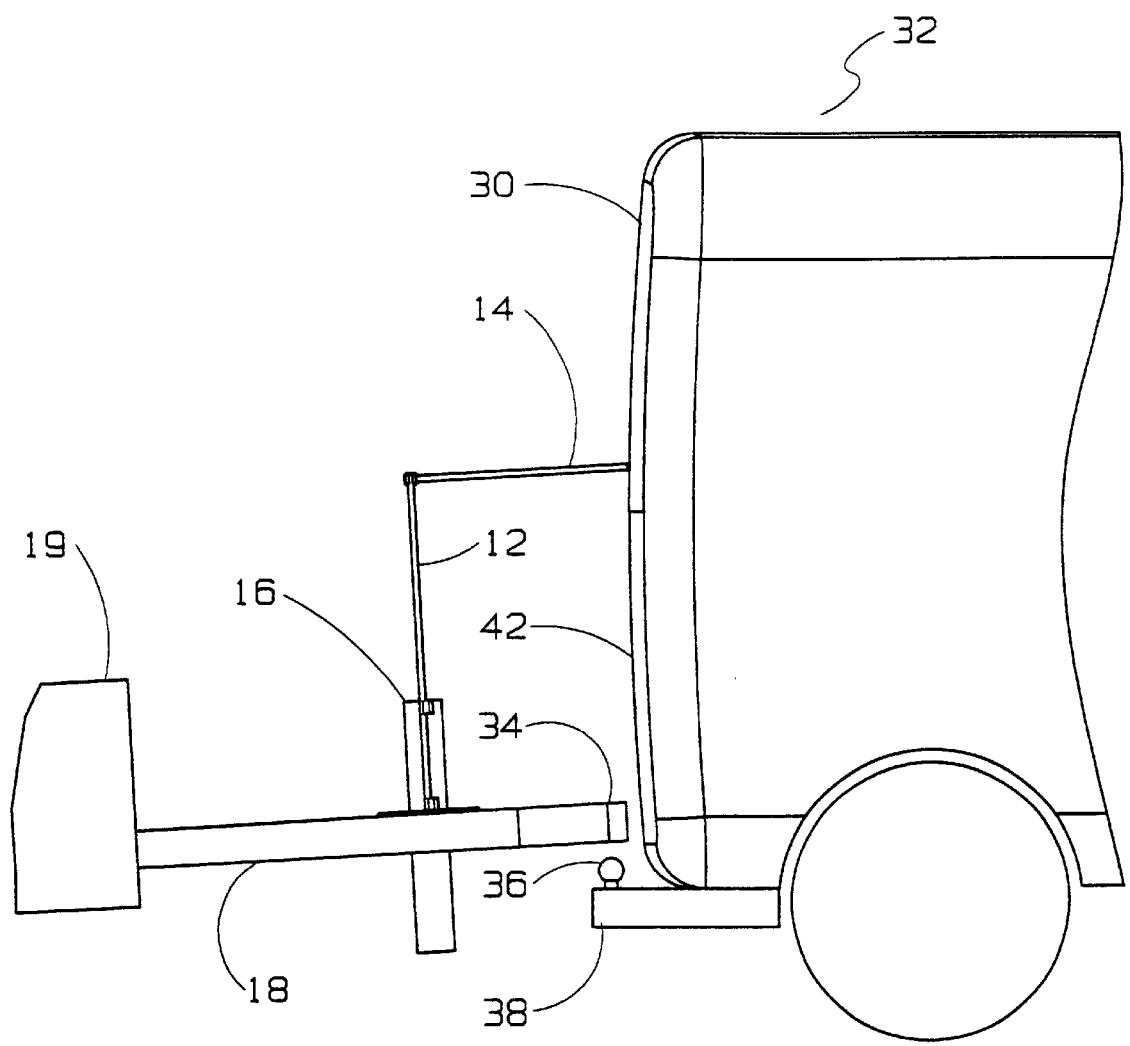
FIG. 2 is, in side elevation view, the trailer hitch coupling guide of FIG. 1.
Figure 3:
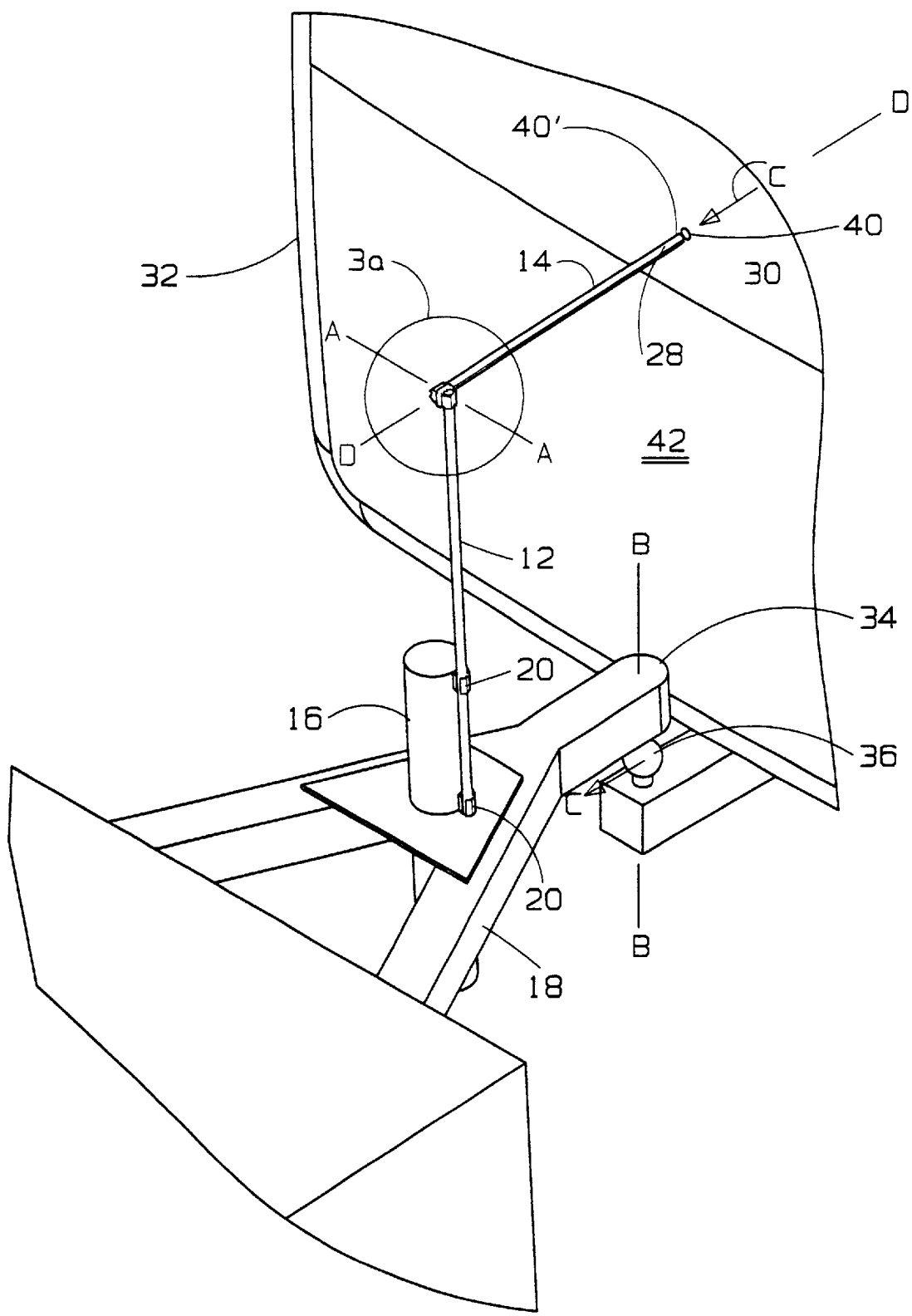
FIG. 3 is, in enlarged partially cut-away view, the trailer hitch coupling guide of FIG. 1 aligning a hitch ball.
Figure 4:
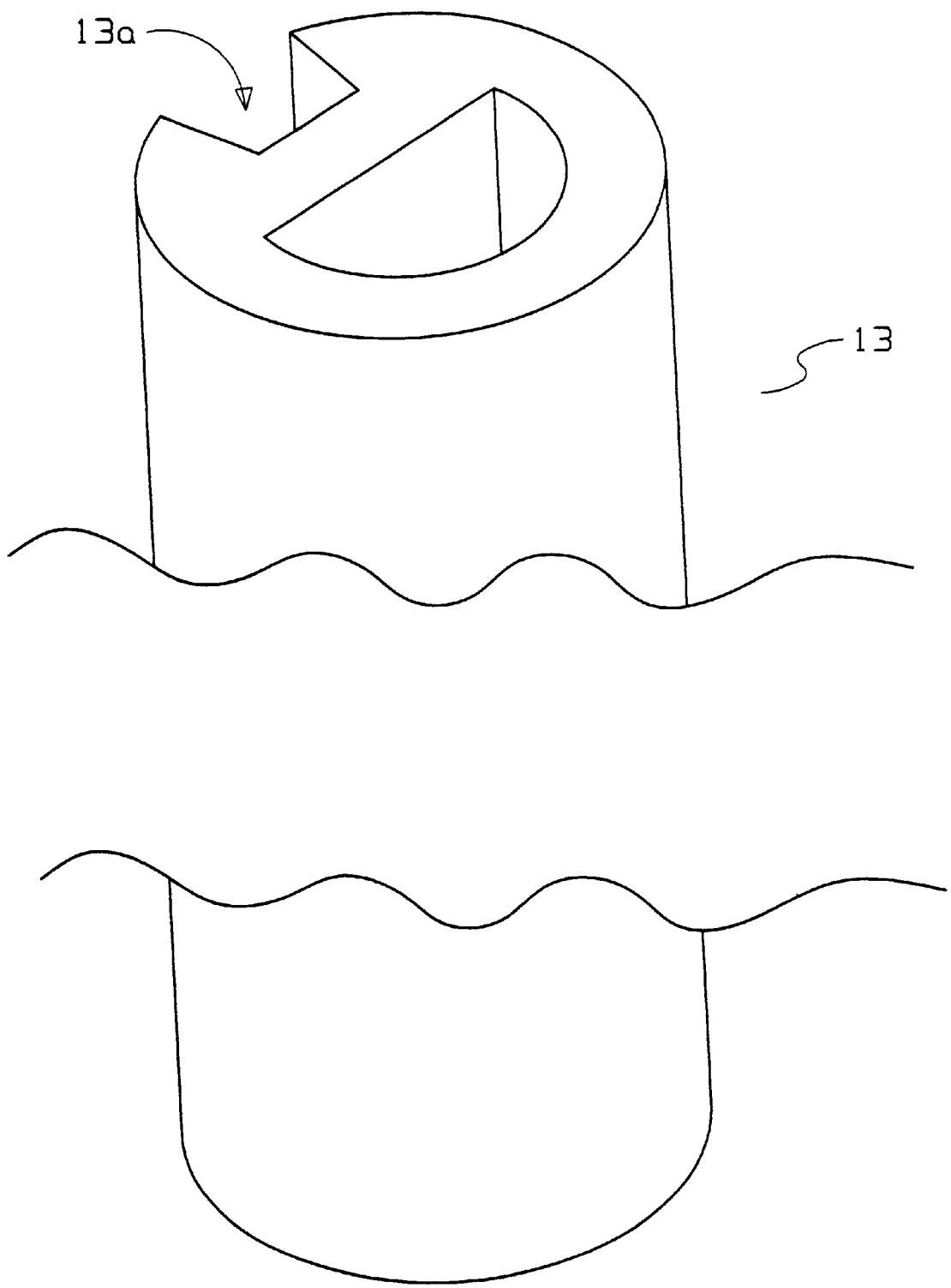
FIG. 4 is, in partially cut-away perspective view, the elongate tubular member of the vertical and horizontal members of the trailer hitch coupling guide of the present invention.
Figure 5:
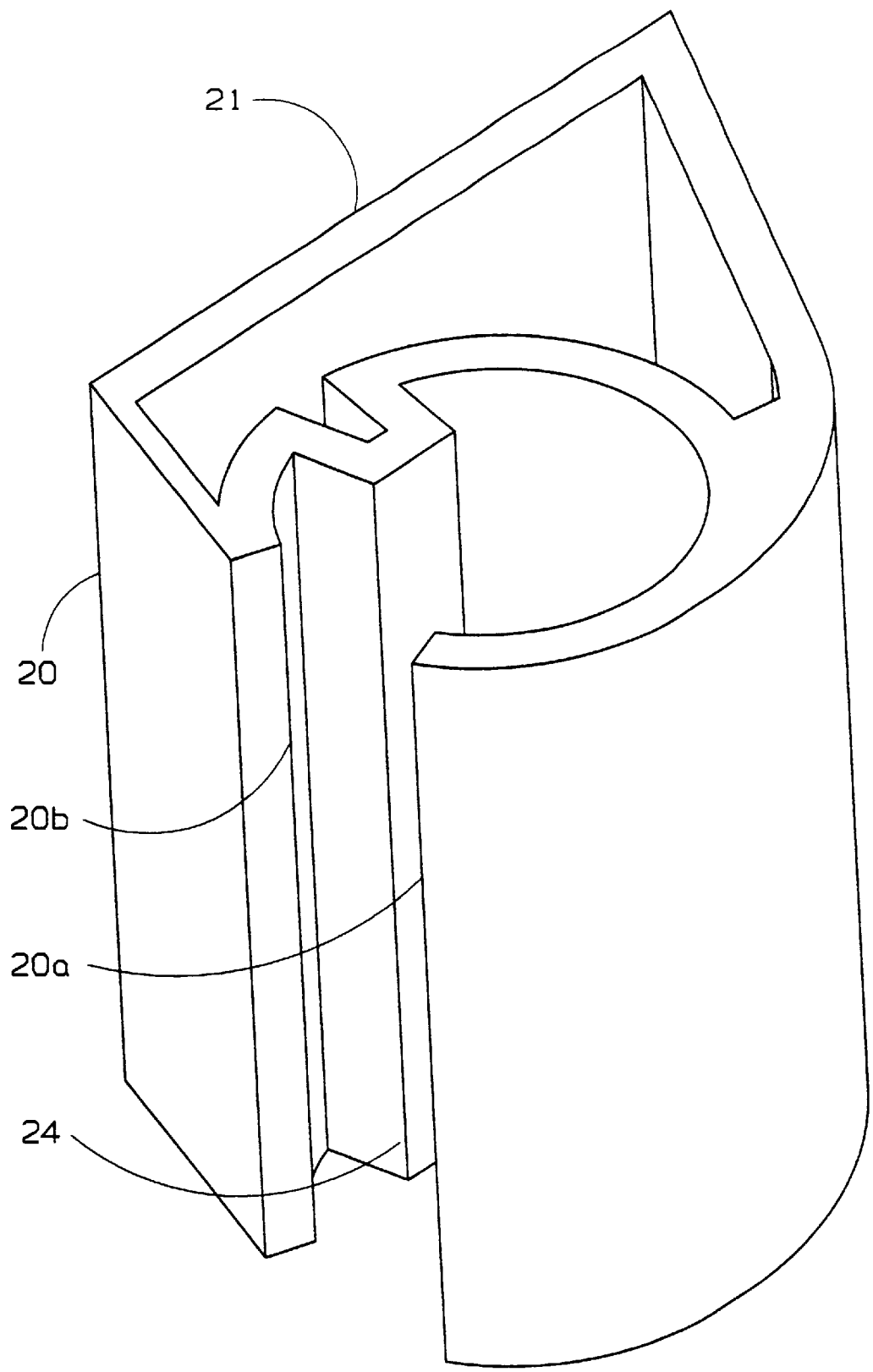
FIG. 5 is, in perspective view, one clamp member of FIG. 3.
Figure 6:
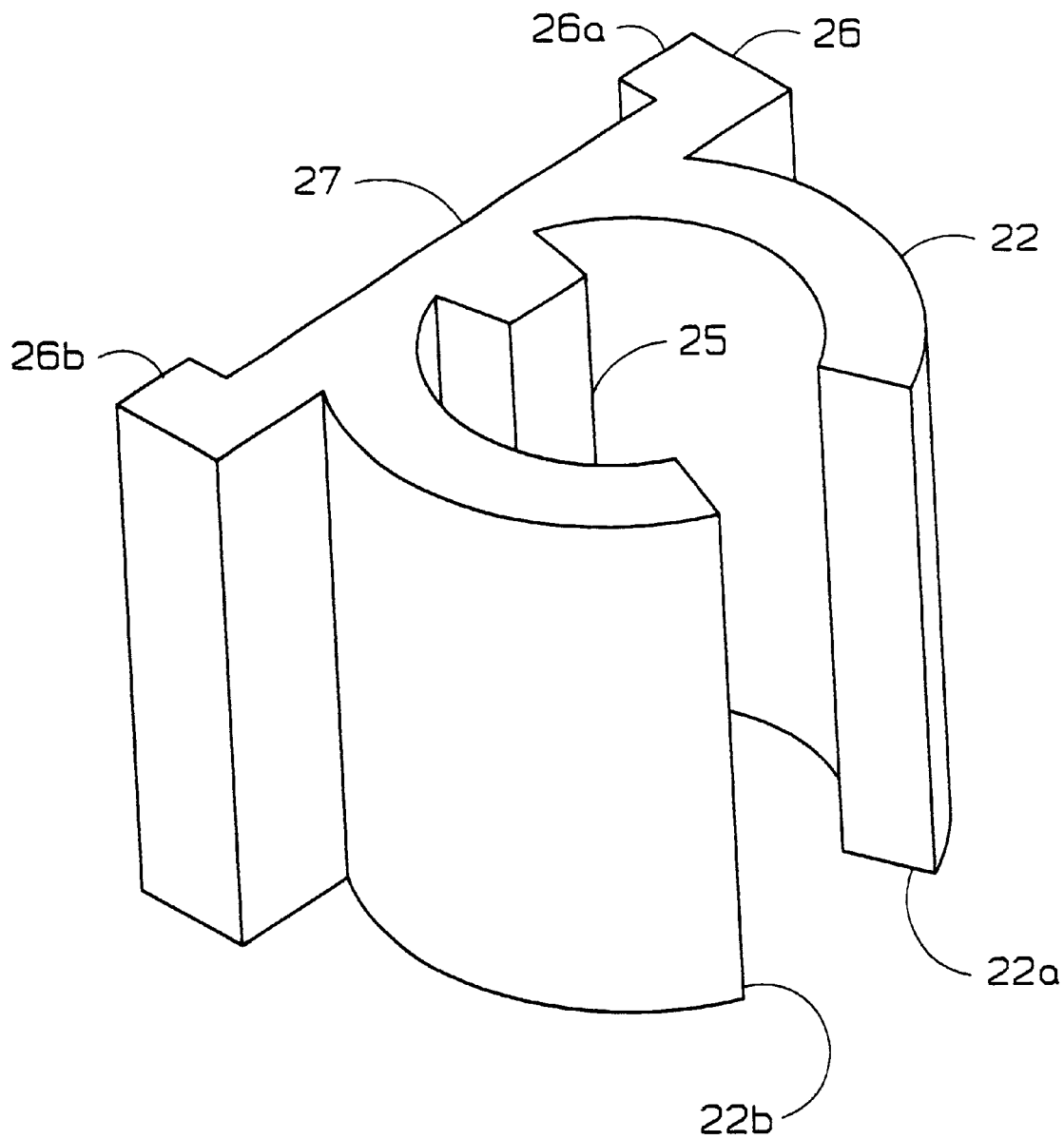

Thus as seen in FIGS. 1, 2 and 3, guiding device 10 generally comprises a vertical member 12 and a horizontal member 14. In the preferred embodiment, members 12 and 14 are, as seen in FIG. 4, elongate tubular members 13 having a longitudinal channel 13a along one side. Vertical member 12 is releasably mountable to a conventional crank 16, typically mounted onto drawbar 18 of a trailer 19 so that, with crank 16 vertically aligned, vertical member 12 may be releasably mountable thereto by means of snap-in clamp members 20 better seen in FIG. 5. Clamp members 20 may be mounted to the upper end of crank 16 by adhesive mounting means, clamps, straps (not shown). For example, surface 21 may be adhered to the surface of crank 16. Advantageously, as seen in FIGS. 2 and 3, the clamp members 20 are mounted to one side of the crank (or other supporting member) so that excessive rearward force applied to the vertical member (for example during backing of the vehicle) will snap the vertical member rearwardly out of the clamps rather than break vertical member 12.

Figure 3A:
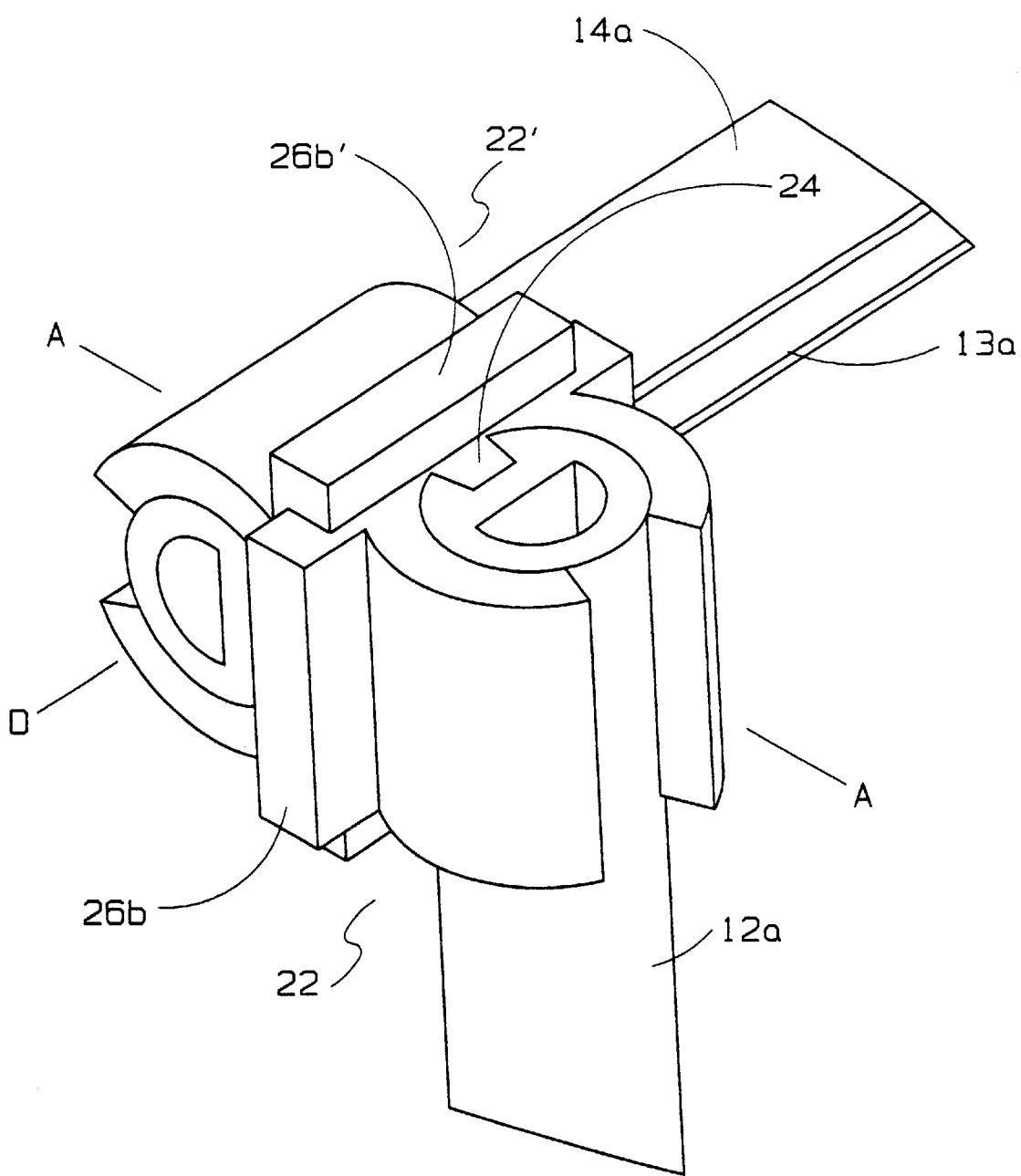
FIG. 3a is an enlarged partially cut-away view of the coupling between the vertical and horizontal members of the trailer hitch coupling guide of FIG. 1.

Vertical member 12 snugly snaps into resiliently clamped mating engagement between resilient arm 20a and base arm 20b on clamp member 20 so that flanges 24 on clamp members 20 mate within channel 13a on member 12 thereby maintaining the longitudinal alignment of horizontal member 14 mounted to vertical member 12. Horizontal member 14 is releasably mounted to vertical member 12 by means of a pair of clamp members 22. One of the clamp members 22 is snap mounted to an upper end of vertical member 12. The other is snap mounted to a first end of member 14. Each clamp member 22 has a coupling bracket 26 and mounts onto members 12 and 14 so as to mate flanges 25 into channels 13a. With one clamp member 22 clamped onto first end 14a of member 14 by the resilient clamping of arms 22a and 22b around the shaft of member 14, and with the other clamp member 22 clamped onto the upper end 12a of member 12 by the resilient clamping of its corresponding arms, coupling brackets 26 are aligned in opposed facing relation. Brackets 26 are offset 90 degrees from each other about axis A so that bracket flanges 26a and 26b may be interlocked as better seen in FIG. 3a to press and flush mount bands 27 together. Member 14 is thus rigidly maintained perpendicular to, and cantilevered from, member 12.

Horizontal member 14 is slidably adjustable relative to vertical member 12 so that, when adjusted, a distal end 28 of horizontal member 14 comes into close adjacency or light contact with a rearmost surface of window 30 on vehicle 32 when drawbar hood 34 is correctly, vertically aligned along axis B over hitch ball 36 on hitch ball supporting member 38.

Figure 7:
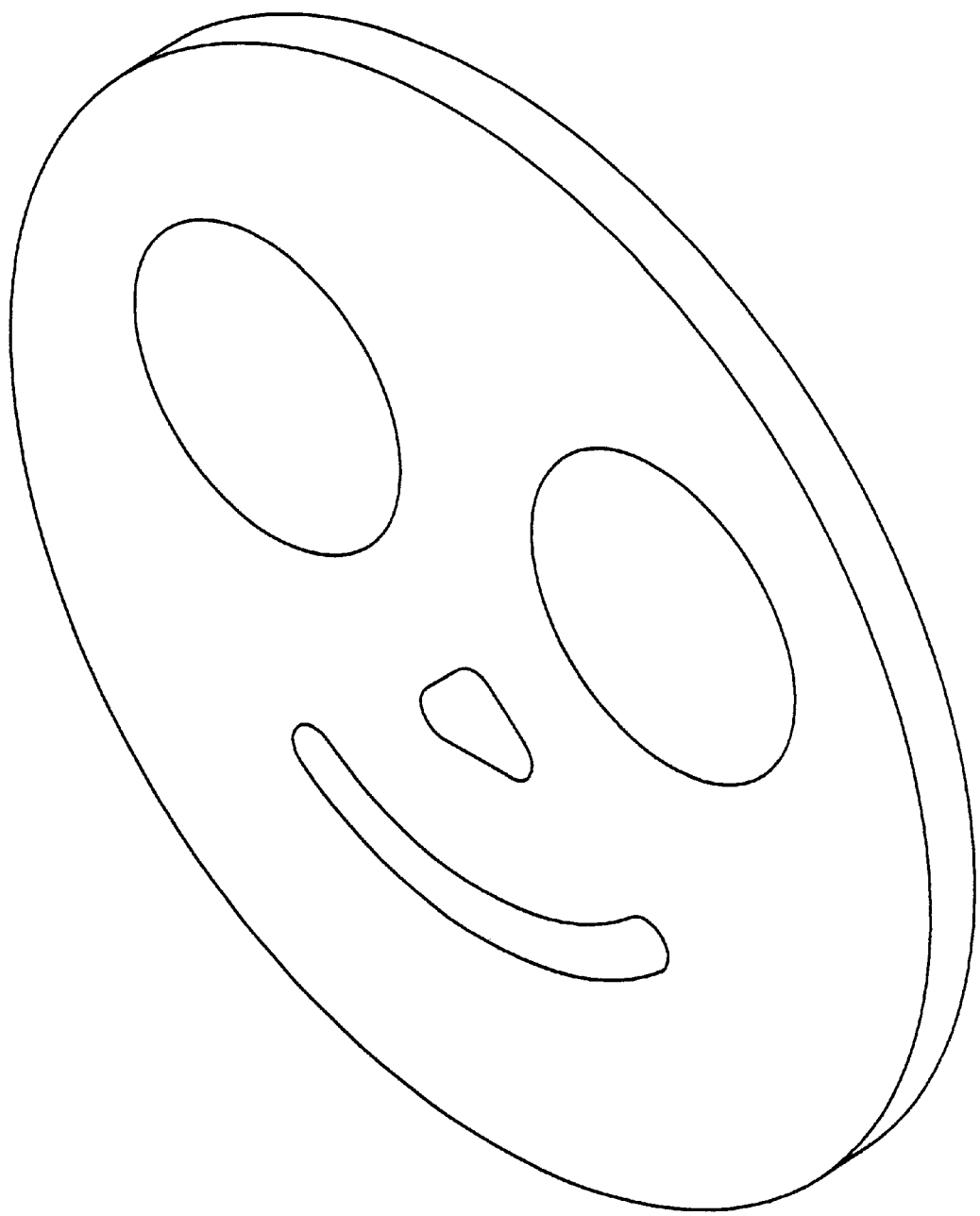
FIG. 7 is, in isometric view, an alignment indicating sticker.

Proper alignment of hood 34 over hitch ball 36 is indicated to the operator of vehicle 32 by use of an appliqué or sticker 40 such as illustrated by way of example in FIG. 7. Advantageously, sticker 40 is transparent or translucent so that distal end 28 may be viewed through sticker 40 as vehicle 32 is being translated in direction C towards the trailer. Longitudinal alignment of hood 34 over hitch ball 36 is indicated when distal end 28 is in close adjacency or lightly touching, for example along axis D, sticker 40 on window 30. Correct lateral alignment of hood 34 over hitch ball 36 is indicated when distal end 28 is laterally aligned with sticker 40 on window 30. Thus, rather than requiring a clumsy mechanical device such as a flag or other sighting device as found in the prior art be mounted onto vehicle 32, the guide mechanism of the present invention utilizes a transparent or translucent sticker or other appliqué 40.

A fun aspect of this method of sight alignment is that distal end 28 may itself have a corresponding sticker 40' attached to it viewable by an operator of vehicle 32 through window 30. Thus, if sticker 40' on distal end 28 is a representation of a face, and sticker 40 on window 30 is also a representation of a face, then the objective in order to align hood 34 over hitch ball 36 is to bring the two stickers together until they "kiss".

Of course it is understood that rather than being relatively adjustable relative to one another, vertical member 12 and horizontal member 14 may be rigidly mounted to one another in a predetermined relation customized for particular vehicles.

The trailer hitch guide of the present invention may be also adapted for use with pickup trucks. In the case that vehicle 32 is a pickup truck having a tailgate 42, rather than bringing distal end 28 of horizontal member 14 into contact with sticker 40, the objective is, rather, to vertically align distal end 28 into close adjacency directly above sticker 40 when sticker 40 is mounted onto the inside surface of tailgate 42.

Figure 8:
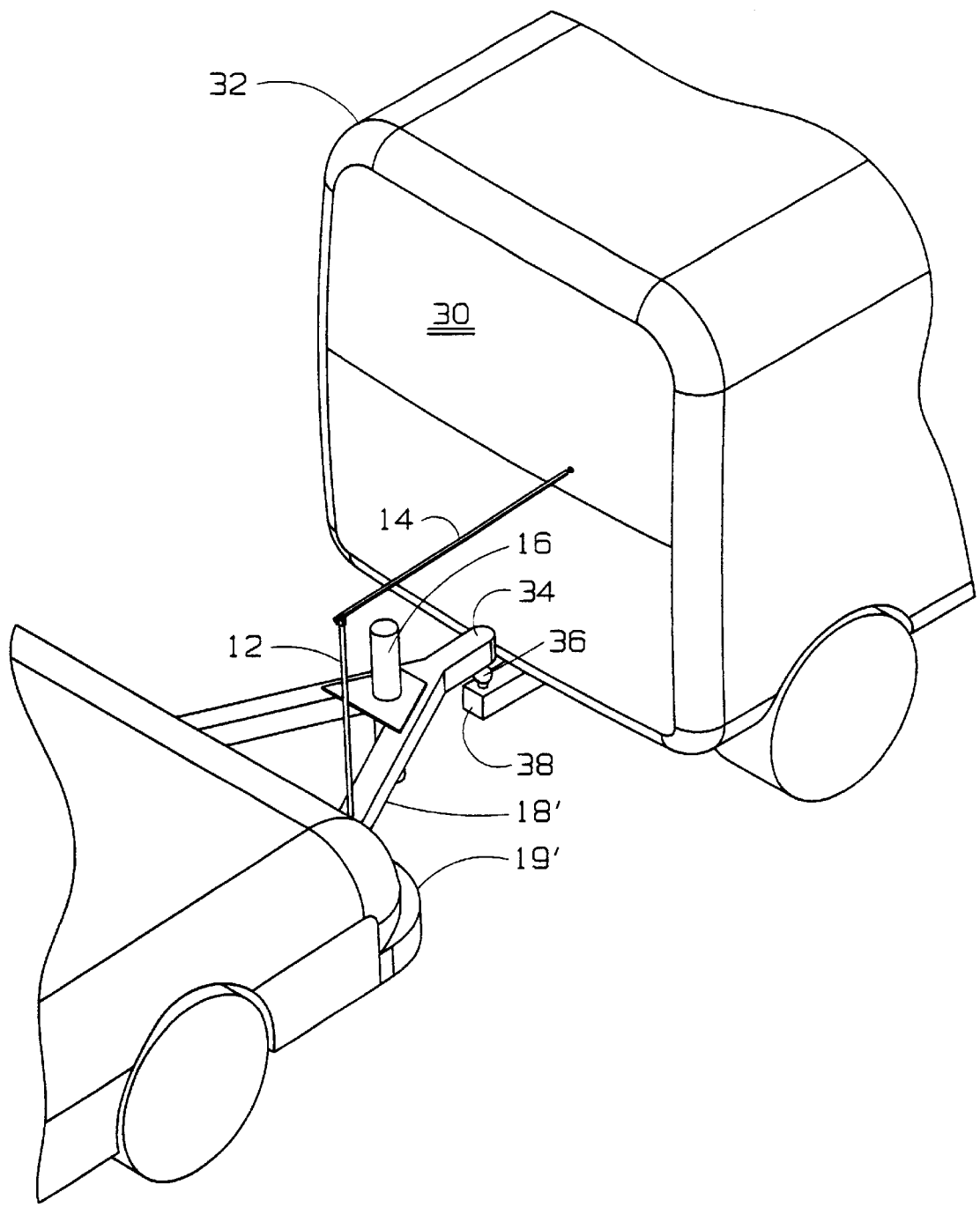
FIG. 8 is, in perspective view, the guide of the present invention to an automobile to be towed.

Further, as seen in FIG. 8, vertical member 12 may be mounted to a frame or bumper of an automobile 19' intended to be towed behind vehicle 32. In this manner, vertical member 12 is kept at a constant orientation relative to window 30 no matter whether the tow bar 18' is lowered in its coupling position or raised to allow for driving of automobile 19' into correct position behind vehicle 32. In this case vehicle 32 may be a large recreational vehicle or bus.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A trailer hitch coupling device comprising:
    an elongate rigid first member mountable, by first mounting means, on a forward end of a wheeled object to be towed,
    said first member, when mounted on said forward end, extending upwardly so that an upper end thereof enters a line-of-sight between said upper end of said first member and a vehicle operator sitting at controls of a vehicle for towing said wheeled object,
    an elongate rigid second member mountable, by second mounting means, to generally said upper end of said first member so as to extend forwardly of said first member and said forward end of said wheeled object towards a rearward end of said vehicle when in a towing position,
    an alignment indicating first sticker mountable to said rearward end of said vehicle in said line-of-sight from said vehicle operator when a hitch hood of said wheeled object is vertically aligned over a hitch ball on said vehicle,
    a distal end of said second member, distal from said first member when mounted to said second member and closest to said rearward end of said vehicle being backed towards said forward end, positioned so as to align with said first sticker when mounted to said rearward end of said vehicle in said line of sight,
    wherein said first and second members have longitudinal grooves, and said first and second mounting means have flanges correspondingly sized so as to snugly mate within said grooves so as to rigidly mount said first member to said first mounting means and said first and second members to said second mounting means.

2. The device of claim 1 wherein said first sticker is mountable to a rear window of said vehicle and is translucent or transparent, and said distal end is positioned to be adjacent or contacting said first sticker when said hitch hood is vertically aligned over said hitch ball.

3. The device of claim 1 wherein said first said second mounting means are clamps.

4. The device of claim 3 wherein said first mounting means is a first resilient snap clamp and said second mounting means is a second snap clamp.

5. The device of claim 4 wherein said first and second members are tubular shafts, and said first and second snap clamps have resilient arms for snug resilient mating around said tubular shafts.

6. The device of claim 5 wherein said second snap clamps are a pair of "C"-shaped snap clamps mounted back-to-back and offset 90 degrees from one another about an axis through said second snap clamp and perpendicular to said first and second members.

7. The device of claim 6 wherein said first snap clamps are a pair of "C"-shaped snap clamps mountable spaced apart on said forward end of said wheeled object.

8. The device of claim 7 wherein said first snap clamps are mountable on a drawbar of said wheeled object.

9. The device of claim 7 wherein said first snap clamps are mountable on a drawbar jack of said wheeled object.

10. The device of claim 7 wherein said first snap clamps are mountable on a crank of said wheeled object.

11. The device of claim 1 wherein a second sticker is mounted to said distal end so as to be in opposed facing relation to said first sticker when said first sticker is mounted to said vehicle in said line of sight and when said hitch hood is vertically aligned over said hitch ball.

12. The device of claim 1 wherein said first sticker is transparent.

13. The device of claim 11 wherein said first sticker is transparent.

* * * * *